United States Patent [19]

Moore

[11] Patent Number: 5,204,586
[45] Date of Patent: Apr. 20, 1993

[54] SOLAR POWERED LAMP HAVING A CIRCUIT FOR PROVIDING POSITIVE TURN-ON AT LOW LIGHT LEVELS

[75] Inventor: Fred A. Moore, Newbury Park, Calif.

[73] Assignee: Siemens Solar Industries, L.P., Camarillo, Calif.

[21] Appl. No.: 731,672

[22] Filed: Jul. 17, 1991

[51] Int. Cl.$^5$ .......................................... H05B 37/00
[52] U.S. Cl. .................................. 315/159; 315/157; 315/158; 250/214 AL
[58] Field of Search .................. 315/76, 157, 158, 159; 250/214 AL; 361/175

[56] References Cited

U.S. PATENT DOCUMENTS

| | | |
|---|---|---|
| 3,833,804 | 9/1974 | Vesely . |
| 4,009,535 | 3/1977 | Stock . |
| 4,283,657 | 8/1981 | Gordon . |
| 4,314,198 | 2/1982 | Rogers ........................ 250/214 AL |
| 4,333,136 | 6/1982 | Baker . |
| 4,384,317 | 5/1983 | Stackpole . |
| 4,484,104 | 11/1984 | O'Brien . |
| 4,486,820 | 12/1984 | Baba et al. . |
| 4,587,459 | 5/1986 | Blake . |
| 4,661,758 | 4/1987 | Wittaker . |
| 4,774,648 | 9/1988 | Kakuk et al. . |
| 4,835,664 | 5/1989 | Wen . |
| 4,841,416 | 6/1989 | Doss . |
| 4,843,525 | 6/1989 | Williams . |
| 4,847,483 | 7/1989 | Nishibe et al. ................ 250/214 AL |
| 5,041,952 | 8/1991 | Janda et al. . |

Primary Examiner—Robert J. Pascal
Attorney, Agent, or Firm—Nilsson, Wurst & Green

[57] ABSTRACT

A solar powered lamp having a circuit for providing positive turn-on at low light levels causes a light source thereof to undergo a discrete transition to an "on" condition and prevents unnecessary drain on a battery thereof. The circuit comprises a positive feedback loop which amplifies current flow rapidly to a predetermined level at which the light source is illuminated. In doing so, it causes a plurality of solar powered lamps to illuminate at substantially the same time.

13 Claims, 3 Drawing Sheets

SOLAR POWERED LAMP HAVING A CIRCUIT FOR PROVIDING POSITIVE TURN-ON AT LOW LIGHT LEVELS

FIELD OF THE INVENTION

This invention relates generally to solar powered lamps. More specifically, the invention relates to a solar powered lamp having a circuit for providing positive turn-on at low light levels.

BACKGROUND OF THE INVENTION

Electrically powered outdoor lighting systems are used to illuminate pathways, yards, parks and other like outdoor areas for security purposes. Commonly, such lights are connected to public utility systems or similar sources of electrical power and are controlled by preset timing devices to illuminate desired areas at nightfall and automatically turn off at a predetermined time, for example, prior to daybreak.

Many conventional lighting devices require extensive cabling, suitable timing mechanisms and the like, and are thus relatively expensive to install and maintain. In addition, such lighting devices utilize electric power generated in a conventional manner such as by burning fuel. Burning fuel contributes to contamination of the environment and depletion of existing fuel resources.

More recent lighting devices include self-contained solar powered devices which utilize photovoltaic cells to charge batteries which, in turn, activate a light source contained therein, in the absence of sunlight. Such self-contained devices are desirable because they are relatively inexpensive and maintenance-free.

A plurality of such solar powered lamps can be disposed in any predetermined arrangement outdoors to illuminate or delineate desired areas. For example, a particular area, such as a pathway, may be easily delineated so that a person, even in complete darkness, can follow the pathway without the necessity of producing overhead illumination.

Although prior solar powered illumination devices are known to serve their purpose, they have not proven entirely satisfactory. During a certain period of time approaching sundown, when the level of ambient light is such that illumination is not required, for example when the ambient light decreases to a level between 600–1500 LUX, the solar powered lamps are known to turn on partially and slowly. This is undesirable because current is drawn from the batteries for a substantial period of time during which illumination is not necessary, thereby significantly shortening the run time for the lamp.

In addition, the control circuitry of the solar powered lamps typically causes a significant drain on the battery, for example between 8–30 mA, even during times when the solar powered lamp is operating and illumination is required. Again, this considerably shortens the run time of the lamp.

Moreover, in situations where a plurality of such solar powered lamps are used, erratic illumination often occurs. The lamps illuminate at different times, for example, sometimes at intervals as much as 30 minutes apart, because manufacturing tolerances inherent in individual components of these prior devices affect their operation. Such irregular illumination is inefficient, unattractive and consequently undesirable.

SUMMARY OF THE INVENTION

The present invention is directed to a solar powered lamp having a circuit for providing positive turn-on at a preselected low level which causes a light source thereof to undergo a discrete transition to an "on" condition and prevents unnecessary drain on a battery thereof.

In one aspect of the invention, the solar powered lamp, comprises: a photovoltaic cell for receiving sunlight and generating electrical energy; an electrical storage device coupled to the photovoltaic cell for receiving and storing electrical energy; light sensing means for generating a control signal in response to ambient light; and means for providing positive turn-on at a preselected low light level, the positive turn-on means having a feedback loop which amplifies the control signal to apply the electrical energy to the light source.

In another aspect of the invention, control circuitry of the solar powered lamp is configured to cause the lamp to turn on when ambient light decreases to a level of approximately 5 LUX.

In still another aspect of the invention, the control circuitry of the solar powered lamp draws only 0.1 mA of current.

These as well as other features of the invention will become apparent from the detailed description which follows, considered together with the appended drawings.

BRIEF DESCRIPTION OF THE DRAWINGS

A preferred embodiment of the present invention is illustrated in and by the following drawings in which like reference numerals indicate like parts and in which.

DETAILED DESCRIPTION OF THE PREFERRED EMBODIMENT

Figure 1:
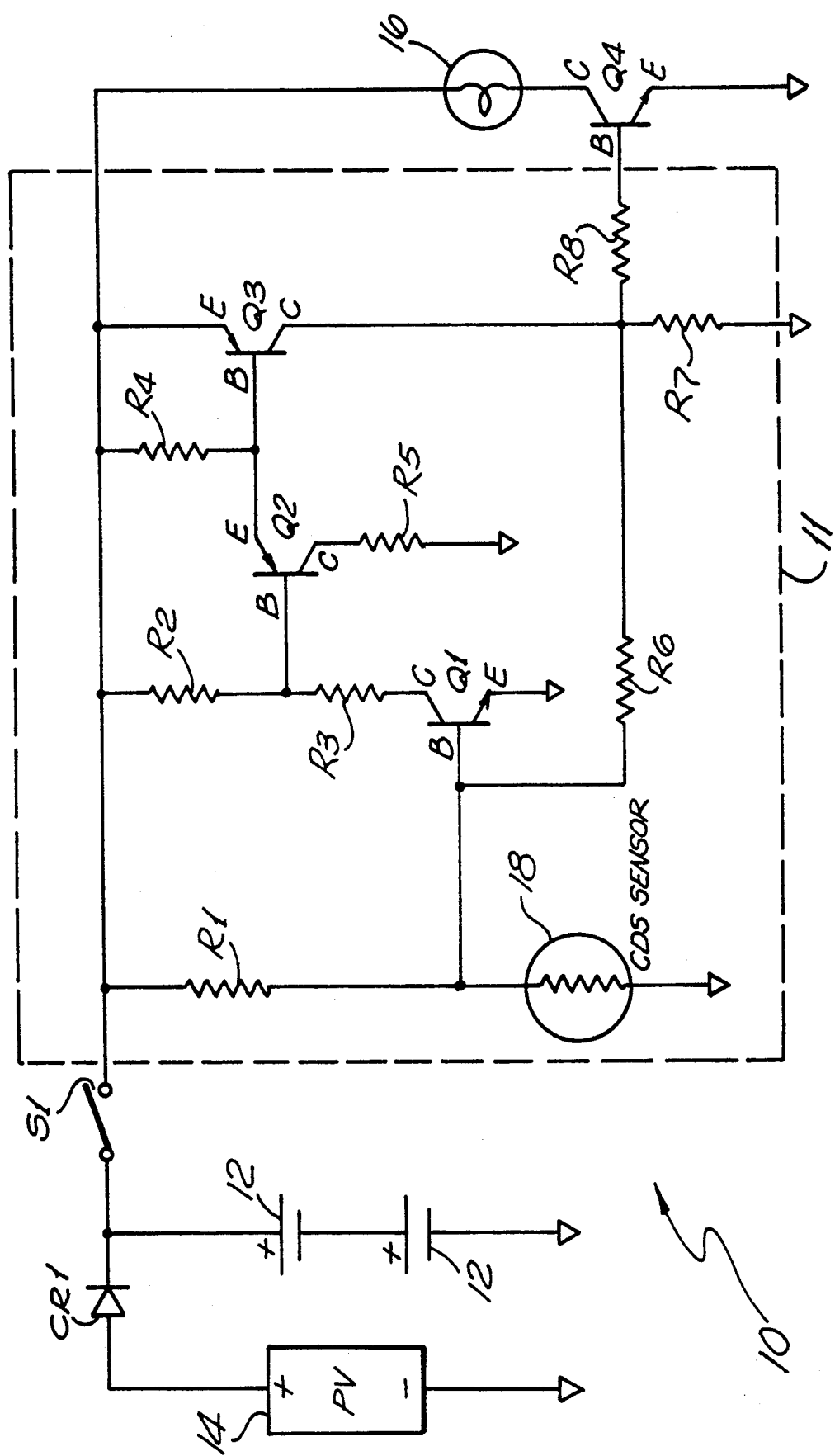
FIG. 1 is a schematic diagram of a solar powered lamp having a circuit for providing positive turn-on at low light levels in accordance with a preferred embodiment of the present invention, configured for use with incandescent lamps.
Figure 3:
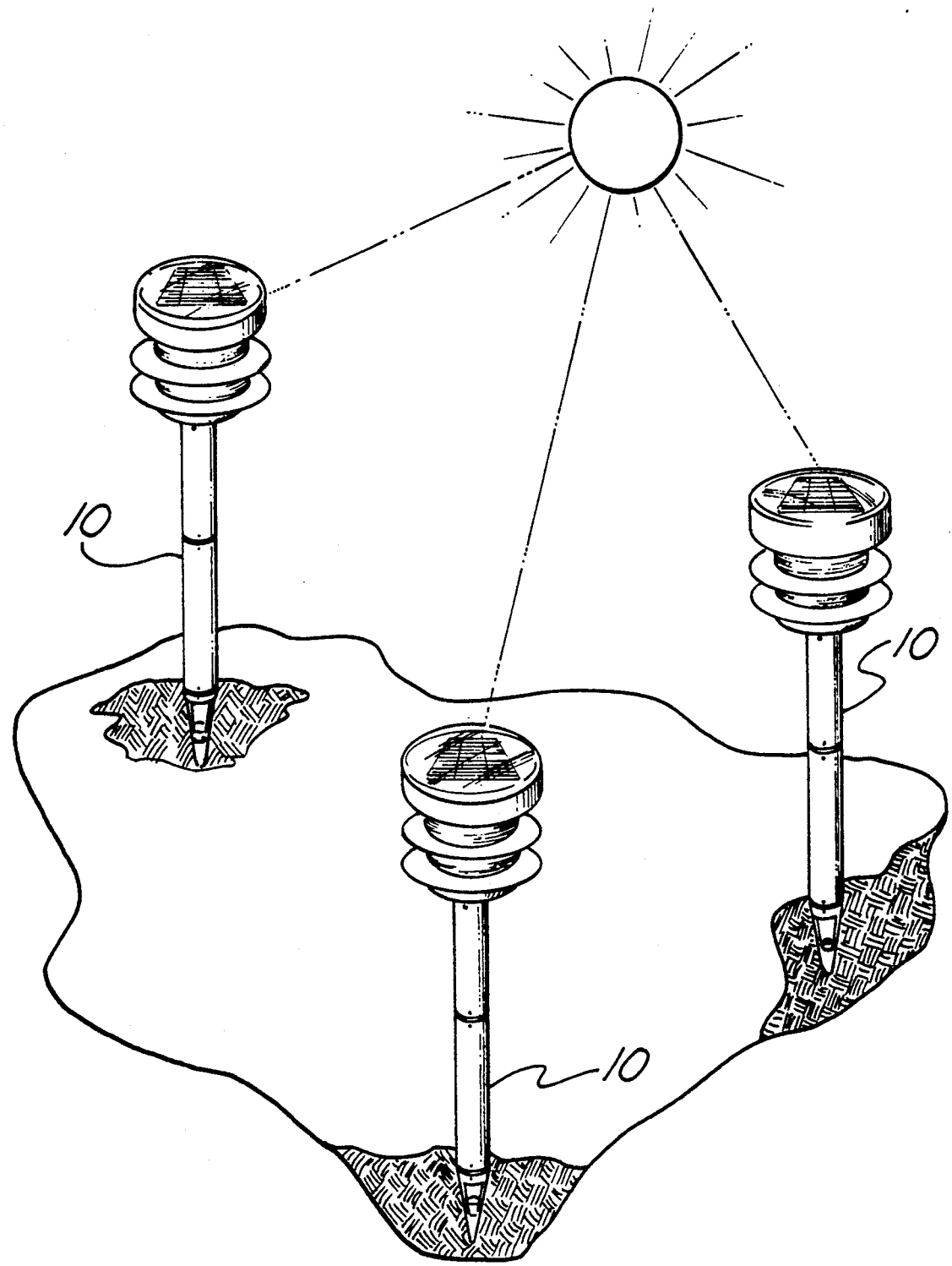
FIG. 3 is a perspective view of solar powered lamps disposed in a predetermined arrangement.

FIG. 1 illustrates generally a schematic diagram for a solar powered lamp 10 having a circuit 11 for providing a positive turn-on at low light levels which is predictable and controlled in contrast with prior solar powered lamps. The circuit 11 as shown in FIG. 1 is configured for use with an incandescent light source 16. The circuit 11 advantageously causes the solar powered lamp 10 to undergo a discrete transition to an "on" condition at a preselected level of ambient light, thereby preventing an unnecessary drain on a battery 12. The circuit 11 also advantageously reduces the dependence of this preselected light level on the manufacturing tolerances of individual components by producing a high gain. In situations where a plurality of solar powered lamps are used, (shown in FIG. 3) this results in each one turning on at substantially the same time.

The solar powered lamp can typically include one or more batteries 12 of conventional design (preferably nickel-cadmium or the like) which is maintained in a charged condition by a photovoltaic cell 14 which controls the application of electrical power to the light source 16. The light source 16 is an incandescent lamp, of conventional design typically used in solar powered lamps. As is well known to those skilled in the art, the photovoltaic cell 14, when generating electrical power as a result of some light striking the same, is used to charge the battery 12. During such period of time, there is no need for the light source 16 to provide light. Thus, the light source 16 is disconnected from the power source, whether it be the photovoltaic cell 14 or the battery 12, during such time. However, when the voltage generated by photovoltaic cell 14 drops below a predetermined level, which represents the level of ambient light, then the power source consisting of the battery 12 is automatically connected so as to illuminate the light source 16.

The photovoltaic cell 14 is interconnected with the battery 12. Connected between the positive terminal of the photovoltaic cell 14 and the positive terminal of the battery 12 is a current steering diode CR1, having an exemplary part number 1N5817, which prevents the battery 12 from discharging through the photovoltaic cell 14 when it is not producing a significant amount of electricity, such as during nighttime.

A switch S1, of conventional design, connects the battery 12 to the light source 16 to provide power thereto when a light sensor 18 does not detect light. The light sensor 18 is preferably a cadmium sulfide photo cell. Upon sensing light, the light sensor 18 provides a low resistance which causes a resistor R1, having an exemplary resistance value of 39 kΩ, to be shunted to ground. This causes current to flow through the resistor R1 and prevents current from flowing into the base of a transistor Q1, preferably a NPN transistor having an exemplary part number 2N3904. This turns off the transistor Q1, preventing current flow through the remainder of the circuit 11 and thereby preventing the light source 16 from turning on.

In the absence of light, the light sensor 18 provides a high resistance, which causes a portion of the current flowing through the resistor R1 to flow into the base of the transistor Q1. This turns on the transistor Q1, which in turn causes current to flow through resistors R2 and R3, having exemplary resistance values of 10 kΩ and 1 kΩ, respectively. The resulting voltage drop across the resistors R2 and R3 biases the base of a transistor Q2, preferably a PNP transistor having an exemplary part number 2N3906, causing it to turn on. When the transistor Q2 turns on, current flows through resistors R4 and R5, having exemplary resistance values of 10 kΩ and 2 kΩ, thereby turning on a transistor Q3, preferably a PNP transistor having an exemplary part number 2N3906.

When the transistor Q3 turns on, current flows through a resistor R7, having an exemplary resistance value of 2 kΩ, and creates a voltage drop across the resistor R7. The voltage drop across the resistor R7 creates a bias, through a resistor R8, having an exemplary resistance value of 100 Ω, at the base of a transistor Q4, thereby turning it on. The transistor Q4 is preferably a NPN transistor having exemplary part number 2N4401. When the transistor Q4 turns on, it allows current to flow from the battery 12 through the light source 16, thereby causing it to illuminate. The transistors Q1, Q2, Q3 and resistors R3, R5 and R6 are configured in accordance with a Schmitt trigger circuit.

A feedback resistor R6, having an exemplary resistance value of 220 kΩ, is connected between the resistor R7 and the base of the transistor Q1. When the transistor Q3 is just beginning to turn on, the voltage drop across the resistor R7 begins to build. As this voltage drop builds, the feedback resistor R6 provides an increasing amount of current to the base of the transistor Q1. This increases the rate at which the transistor Q1 turns on, thereby increasing the rate at which the transistor Q3 turns on and the rate at which the voltage drop across the resistor R7 builds. As the voltage drop across the resistor R7 builds more rapidly (toward a steady state value of approximately 2.5 volts which is the battery voltage), the amount of current provided through the feedback resistor R6 also increases until the circuit 11 reaches a "fully-on" steady state. Thus, the feedback resistor R6 causes the circuit 11 to turn on rapidly and thus avoids the problem of slow turn-on of solar powered lamps.

When the light sensor 18 detects ambient light, it provides a low resistance. The low resistance shunts the current from the resistor R1 and the feedback resistor R6 to ground, thereby turning the circuit 11 off. This causes the light source 16 to be turned off.

The transistor Q3 serves to enhance the current drive capability of the circuit 11 such that variations in the values of the various components from one device to another are relatively insignificant. Thus, the manufacturing tolerances in the values of the circuit elements have very little impact on operation of the circuit 11 and particularly on the level of ambient light at which the solar powered lamp 10 turns on. This causes the solar powered lamp 10 to turn on in a predictable and controlled manner, as a result of which a plurality of such solar powered lamps 10 exposed to similar lighting conditions turn on substantially together. In a preferred embodiment, this occurs when the level of ambient light decreases to approximately 5 LUX.

Figure 2:
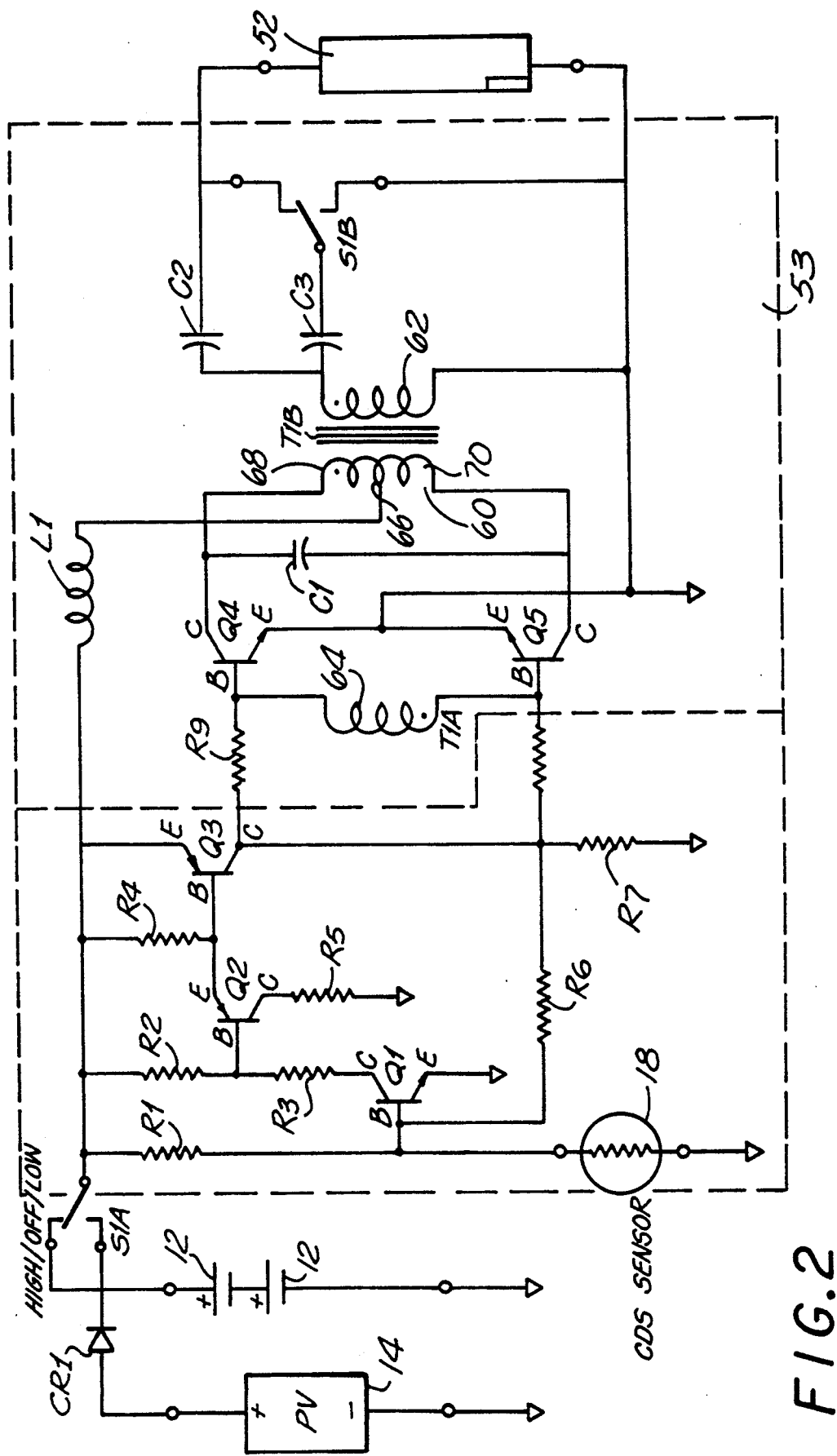
FIG. 2 is a schematic diagram of the solar powered lamp shown in FIG. 1, configured for use with fluorescent lamps.

Referring now to FIG. 2, a circuit 50 which provides power to a solar powered lamp having a cold cathode fluorescent lamp 52 is shown. The circuit 50 incorporates the positive turn on circuit 11 of FIG. 1. In a situation where the solar powered lamp 10 has a shadow fall thereon which decreases the level of ambient light and causes the lamp 10 to turn on, resistor R8 drains the energy of the circuit 11 to quickly turn off the lamp 10 once the shadow has gone. The circuit 50 includes circuitry 53 for converting the low voltage of approximately 2.5 volts DC provided by the battery 12 into an alternating current approximately in the range of 170–180 volts AC for operating the cold cathode fluorescent lamp 52.

A transformer T1 having a primary winding 60, a secondary winding 62 and a tertiary or feedback winding 64 is electrically connected to transistors Q3 and Q4, preferably NPN transistors having exemplary part number 2N4401. Resistors R8 and R9, having exemplary resistance values of 680 Ω, are connected between the collector of the transistor Q3 and the bases of transistors Q4 and Q5, respectively. The feedback winding 64 is connected between the bases of transistors Q4 and Q5. Transistors Q4 and Q5 act as switches alternately connecting the low voltage of approximately 2.5 volts DC across the primary winding 60.

The feedback winding 64 is arranged in such a way that the base of the non-conducting transistor is negative whereas the base of the conducting transistor is positive. The feedback winding 64 is electrically connected between the bases of transistors Q4 and Q5, as a result of which one of the transistors Q4 and Q5 conducts more than the other. If transistor Q4 is conducting, the feedback winding 64 electrically connected thereto more positively biases transistor Q4 with respect to transistor Q5, causing transistor Q4 to turn on fully and transistor Q5 to turn off. When transistor Q4 is conducting, current flows from the battery 12 through an inductor L1, having an exemplary inductance value of 130 μH, to a center tap 66 of the primary winding 60 and through an upper half 68 of the primary winding 60. The current flows through the transistor Q4 from the collector to the emitter and returns to the negative terminal 56 of the battery 12.

The flow of current along this path continues until the transformer T1 begins to saturate and the polarity of the feedback winding 64 between the bases of transistors Q4 and Q5 is reversed. Transistor Q4 is then turned off and transistor Q5 starts conducting, thus creating flow in the opposite direction through transistor Q5.

When transistor Q5 is conducting, current flows from the battery 12 through the inductor L1 to the center tap 66 of the primary winding 60 and through a lower half 70 of the primary winding 60. The current flows through the transistor Q5 from the collector to the emitter and returns to the negative terminal 56 of the battery 12.

This switching continues in the manner described above to convert the low voltage of approximately 2.5 volts DC provided by the battery to approximately 170 to 180 volts alternating current. A capacitor C1, having an exemplary capacitance value of 0.047 μF, connected in parallel with the primary winding 60 of the transformer T1, produces a parallel resonant LC circuit which helps control the frequency of oscillation which is approximately 30,000 Hz.

A square wave used commonly with hot cathode fluorescent lamps, would destroy the characteristics of the cold cathode lamp and degenerate its lifetime considerably. Accordingly, the inductor L1 together with the transformer T1 creates a resonant invertor circuit which provides a sine wave output voltage. The inductor L1 builds charge when the current flows through it in a given direction, and when flow reverses, discharges back through the transformer T1 to aid in generating a sine wave. The inductor L1, of conventional design, preferably has 84 turns. The transformer T1, also of a type known to those skilled in the art, has 12 turns in its primary winding 60, 6 turns in its feedback winding 64 and 638 turns in its secondary winding 62. The saturation characteristics of the transformer T1 cause the switching to occur.

A capacitor C2 electrically connected between the secondary winding 62 of the transformer T1 and a switch S1B connected across the cold cathode lamp 52 is the series output capacitor, having an exemplary capacitance value of 68 pF. The switch S1B is any three way switch indicating a "High," a "Low" and an "off" position. The capacitor C2 controls the output impedance of the circuit and limits the amount of current flow through the cold cathode lamp 52.

A capacitor C3, having an exemplary capacitance value of 68 pF, electrically connected in parallel with the capacitor C2, increases the lamp current and decreases the output impedance when the switch S1B is in the "High" position. When the switch S1B is in the "Low" position, the lamp current decreases by shunting the output winding and returning output power to the circuit.

The 170 to 180 volts alternating current generated supplies power for heating the electrodes of the cold cathode fluorescent lamp 52 and creating a discharge within the cold cathode florescent lamp 52. This sine wave enhances and extends the life of the cold cathode fluorescent lamp 52 in contrast with a low voltage square wave which would degenerate the characteristics of the cold cathode fluorescent lamp 52.

Although the invention has been described in terms of a preferred embodiment thereof, other embodiments that are apparent to those of ordinary skill in the art are also within the scope of the invention. Accordingly, the scope of the invention is intended to be defined only by reference to the appended claims.

What is claimed is:

1. A solar powered lamp comprising:
 a photovoltaic cell for receiving sunlight and generating electrical energy;
 an electrical storage device coupled to said photovoltaic cell for receiving and storing electrical energy;
 light sensing means other than said photovoltaic cell for generating a control signal in response to ambient light; and
 means for providing positive turn-on at a preselected low light level, said positive turn-on means having a feedback loop which amplifies said control signal to apply said electrical energy to the light source, said positive turn-on means further comprising:
 a first transistor having a collector, base and emitter;
 a second transistor having a collector, base and emitter, said collector of said first transistor electrically connected to said base of said second transistor; and
 a third transistor having a base thereof electrically connected to said emitter of said second transistor.

2. A solar powered lamp as defined in claim 1, wherein said feedback loop further comprises:
 a first resistive means electrically connected between said base of said first transistor and said collector of said third transistor.

3. A solar powered lamp as defined in claim 2, wherein said light source is an incandescent lamp.

4. A solar powered lamp as defined in claim 1, wherein said light source is a cold cathode fluorescent lamp.

5. A solar powered lamp as defined in claim 1, wherein said preselected low light level is substantially 5 LUX.

6. A solar powered lamp comprising:
 a photovoltaic cell for receiving sunlight and generating electrical energy;
 an electrical storage device coupled to said photovoltaic cell for receiving and storing electrical energy;
 light sensing means for generating a control signal in response to ambient light; and
 means for providing positive turn-on at a preselected low light level, said positive turn-on means having a feedback loop which amplifies said control signal to apply said electrical energy to the light source;
 said positive turn-on means further comprising:
 a first transistor having a collector, base and emitter;
 a second transistor having a collector, base and emitter, said collector of said first transistor electrically connected to said base of said second transistor; and a third transistor having a base thereof electrically connected to said emitter of said second transistor; and said feedback loop further comprising:
  a first resistive means electrically connected between said base of said first transistor and said collector of said third transistor;
  a second resistive means electrically connected between said collector of said first transistor and said base of said second transistor; and
  a third resistive means electrically connected to said collector of said second transistor, said first, second and third transistors and said first, second and third resistive means connected in a Schmitt trigger configuration.

7. A plurality of solar powered lamps disposed in proximity to one another at a location, each comprising:
  a photovoltaic cell for receiving sunlight and generating electrical energy;
  an electrical storage device coupled to said photovoltaic cell for receiving and storing electrical energy;
  light sensing means other than said photovoltaic cell for generating a control signal in response to ambient light; and
  means for providing positive turn-on at a preselected low light level, said positive turn-on means having a feedback loop which amplifies said control signal to apply said electrical energy to the light source and cause said plurality of solar powered lamps to turn on at substantially the same time.

8. A plurality of solar powered lamps as defined in claim 7, wherein said positive turn-on means further comprises:
  a first transistor having a collector, base and emitter;
  a second transistor having a collector base and emitter, said collector of said first transistor electrically connected to said base of said second transistor; and
  a third transistor having a base thereof electrically connected to said emitter of said second transistor.

9. A plurality of solar powered lamps as defined in claim 8, wherein said feedback loop further comprises:
  a first resistive means electrically connected between said base of said first transistor and said collector of said third transistor.

10. A plurality of solar powered lamps as defined in claim 9, further comprising:
  a second resistive means electrically connected between said collector of said first transistor and said base of said second transistor; and
  a third resistive means electrically connected to said collector of said second transistor, and first, second and third transistors and said first, second and third resistive means connected in a Schmitt trigger configuration.

11. A plurality of solar powered lamps as defined in claim 7, wherein said light source is an incandescent lamp.

12. A plurality of solar powered lamps as defined in claim 7, wherein said light source is a cold cathode fluorescent lamp.

13. A plurality of solar powered lamps as defined in claim 7, wherein said preselected low light level is substantially 5 LUX.

* * * * *